US007794318B2

(12) United States Patent
Lind et al.

(10) Patent No.: US 7,794,318 B2
(45) Date of Patent: Sep. 14, 2010

(54) USER ALTERABLE PRIZE DISTRIBUTION AND SYSTEM FOR IDENTIFYING RESULTS IN GAMES

(75) Inventors: Clifton E. Lind, Austin, TX (US); Jefferson Craig Lind, Austin, TX (US); Brian Alexander Watkins, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 433 days.

(21) Appl. No.: 11/447,389

(22) Filed: Jun. 6, 2006

(65) Prior Publication Data

US 2007/0293302 A1 Dec. 20, 2007

(51) Int. Cl.
*A63F 9/24* (2006.01)
*A63F 13/00* (2006.01)
*G06F 17/00* (2006.01)
*G06F 10/00* (2006.01)

(52) U.S. Cl. .......................... 463/19; 273/146; 463/16; 463/20; 463/25; 463/42

(58) Field of Classification Search .................. 463/17, 463/19
See application file for complete search history.

(56) References Cited

U.S. PATENT DOCUMENTS 4,679,143 A 7/1987 Hagiwara
4,695,053 A 9/1987 Vazquez, Jr. et al.
5,324,035 A * 6/1994 Morris et al. ................. 463/42
5,551,692 A 9/1996 Pettit et al.
5,655,961 A * 8/1997 Acres et al. ................... 463/27
5,851,147 A 12/1998 Stupak et al.
5,876,284 A 3/1999 Acres et al.
5,938,196 A 8/1999 Antoja
5,941,772 A 8/1999 Paige
5,984,779 A * 11/1999 Bridgeman et al. ........... 463/16
5,993,316 A * 11/1999 Coyle et al. ................... 463/25
6,012,982 A * 1/2000 Piechowiak et al. ........... 463/16
6,068,552 A * 5/2000 Walker et al. ................. 463/21
6,439,996 B2 * 8/2002 LeMay et al. ................. 463/29
6,468,156 B1 * 10/2002 Hughs-Baird et al. ......... 463/25
6,520,856 B1 2/2003 Walker et al.
6,523,824 B1 2/2003 Colapinto et al.
6,524,184 B1 * 2/2003 Lind et al. .................... 463/13
6,569,013 B1 * 5/2003 Taylor ......................... 463/13
6,569,017 B2 5/2003 Enzminger et al.
6,685,559 B2 * 2/2004 Luciano et al. ............... 463/16
6,712,693 B1 * 3/2004 Hettinger ..................... 463/20
6,802,778 B1 * 10/2004 Lemay et al. ................. 463/42
6,857,959 B1 * 2/2005 Nguyen ....................... 463/25
6,960,135 B2 11/2005 Gaidarev et al.
2002/0036380 A1 * 3/2002 Perrie et al. ................. 273/146

(Continued)

*Primary Examiner*—John M. Hotaling, II
*Assistant Examiner*—Paul A. D'Agostino
(74) *Attorney, Agent, or Firm*—Russell D. Culbertson; Nathan H. Calvert; JP Cody

(57) ABSTRACT

A gaming result system is provided with program products, methods, and apparatus to implement an updatable prize result structure. The result structure having several first level result identifiers and an additional second level result. First level results are each associated with an expected number of plays per game. As with each first result level, the additional second result levels are each associated with a respective number of results per given number of plays. In contrast to first level results, the second level results correlate to a game operator assigned value which may be modified during game play to change results provided in subsequent games.

28 Claims, 10 Drawing Sheets

100, 101, 102, 103, 104, 105, 106, 109

| RESULT LEVEL ID | RESULT VALUE | # OF RESULTS | TOTAL VALUE | PAYOUT % | PROB. % |
|---|---|---|---|---|---|
| 0 | 3000 | 1 | 3000 | 3 | .001 |
| 1 | 1000 | 3 | 3000 | 3 | .003 |
| 2 | 500 | 5 | 2500 | 2.5 | .005 |
| 3 | 100 | 30 | 3000 | 3 | .030 |
| 4 | 50 | 50 | 2500 | 2.5 | .050 |
| 5 | 20 | 100 | 2000 | 2 | .1 |
| 6 | 10 | 200 | 2000 | 2 | .2 |
| 7 | 5 | 936 | 4680 | 4.68 | .936 |
| 8 | 2 | 18660 | 37320 | 37.32 | 18.66 |
| 9 | 1 | 30000 | 30000 | 30 | 30 |
| 10 | 0 | 50000 | 0 | 0 | 50 |
| 11 | 0 | 1 | 0 | 0 | .001 |
| 12 | 0 | 2 | 0 | 0 | .002 |
| 13 | 0 | 3 | 0 | 0 | .003 |
| 14 | 0 | 4 | 0 | 0 | .004 |
| 15 | 0 | 5 | 0 | 0 | .005 |
| | TOTALS | 100,000 | 90,000 | 90% | 100% |

U.S. PATENT DOCUMENTS

| | | | | |
|---|---|---|---|---|
| 2003/0228902 | A1* | 12/2003 | Walker et al. | 463/25 |
| 2004/0023713 | A1* | 2/2004 | Wolf et al. | 463/20 |
| 2004/0023715 | A1* | 2/2004 | Luciano et al. | 463/25 |
| 2004/0048657 | A1* | 3/2004 | Gauselmann | 463/25 |
| 2004/0087361 | A1 | 5/2004 | Parker | |
| 2004/0152508 | A1* | 8/2004 | Lind et al. | 463/19 |
| 2004/0242313 | A1* | 12/2004 | Munoz | 463/20 |
| 2005/0032573 | A1 | 2/2005 | Acres et al. | |
| 2005/0049026 | A1* | 3/2005 | Angel | 463/16 |
| 2005/0049037 | A1* | 3/2005 | Anderson et al. | 463/25 |
| 2005/0176494 | A1* | 8/2005 | Thomas | 463/25 |
| 2005/0227753 | A1* | 10/2005 | Luciano | 463/18 |
| 2005/0239530 | A1* | 10/2005 | Walker et al. | 463/16 |
| 2005/0282607 | A1 | 12/2005 | Gauselmann | |
| 2006/0058096 | A1 | 3/2006 | Lind et al. | |
| 2007/0243921 | A1* | 10/2007 | Fanjoy et al. | 463/13 |

* cited by examiner

100

101 102 103 104 105 106

109

| RESULT LEVEL ID | RESULT VALUE | # OF RESULTS | TOTAL VALUE | PAYOUT % | PROB. % |
|---|---|---|---|---|---|
| 0 | 3000 | 1 | 3000 | 3 | .001 |
| 1 | 1000 | 3 | 3000 | 3 | .003 |
| 2 | 500 | 5 | 2500 | 2.5 | .005 |
| 3 | 100 | 30 | 3000 | 3 | .030 |
| 4 | 50 | 50 | 2500 | 2.5 | .050 |
| 5 | 20 | 100 | 2000 | 2 | .1 |
| 6 | 10 | 200 | 2000 | 2 | .2 |
| 7 | 5 | 936 | 4680 | 4.68 | .936 |
| 8 | 2 | 18660 | 37320 | 37.32 | 18.66 |
| 9 | 1 | 30000 | 30000 | 30 | 30 |
| 10 | 0 | 50000 | 0 | 0 | 50 |
| 11 | 0 | 1 | 0 | 0 | .001 |
| 12 | 0 | 2 | 0 | 0 | .002 |
| 13 | 0 | 3 | 0 | 0 | .003 |
| 14 | 0 | 4 | 0 | 0 | .004 |
| 15 | 0 | 5 | 0 | 0 | .005 |
| | TOTALS | 100,000 | 90,000 | 90% | 100% |

*FIG. 1*

100 101 102 201 109

| RESULT LEVEL ID | RESULT VALUE | # OF RESULTS | TOTAL VALUE | % PAYOUT | PROB. % | PAT. SET ID |
|---|---|---|---|---|---|---|
| 0 | 3000 | 1 | 3000 | 3 | .001 | 0 |
| 1 | 1000 | 3 | 3000 | 3 | .003 | 1 |
| 2 | 500 | 5 | 2500 | 2.5 | .005 | 2 |
| 3 | 100 | 30 | 3000 | 3 | .030 | 3 |
| 4 | 50 | 50 | 2500 | 2.5 | .050 | 4 |
| 5 | 20 | 100 | 2000 | 2 | .1 | 5 |
| 6 | 10 | 200 | 2000 | 2 | .2 | 6 |
| 7 | 5 | 936 | 4680 | 4.68 | .936 | 7 |
| 8 | 2 | 18660 | 37320 | 37.32 | 18.66 | 8 |
| 9 | 1 | 30000 | 30000 | 30 | 30 | 9 |
| 10 | 0 | 50000 | 0 | 0 | 50 | NA |
| 11 | 0 | 1 | 0 | 0 | .001 | 10 |
| 12 | 0 | 2 | 0 | 0 | .002 | 11 |
| 13 | 0 | 3 | 0 | 0 | .003 | 12 |
| 14 | 0 | 4 | 0 | 0 | .004 | 13 |
| 15 | 0 | 5 | 0 | 0 | .005 | 14 |

*FIG. 2*

1000

1001 1002 1003 1004 1005 1006

1009

| RESULT LEVEL ID | RESULT VALUE | # OF RESULTS | TOTAL VALUE | PAYOUT % | PROB. % |
|---|---|---|---|---|---|
| 0 | 3000 | 1 | 3000 | 3 | .001 |
| 1 | 1000 | 3 | 3000 | 3 | .003 |
| 2 | 500 | 5 | 2500 | 2.5 | .005 |
| 3 | 100 | 30 | 3000 | 3 | .030 |
| 4 | 50 | 50 | 2500 | 2.5 | .050 |
| 5 | 20 | 100 | 2000 | 2 | .1 |
| 6 | 10 | 200 | 2000 | 2 | .2 |
| 7 | 5 | 936 | 4680 | 4.68 | .936 |
| 8 | 2 | 18660 | 37320 | 37.32 | 18.66 |
| 9 | 1 | 30000 | 30000 | 30 | 30 |
| 10 | 0 | 48922 | 0 | 0 | 48.922 |
| 11 | 0 | 1 | 0 | 0 | .001 |
| 12 | 0 | 1 | 0 | 0 | .001 |
| 13 | 0 | 1 | 0 | 0 | .001 |
| 14 | 0 | 290 | 0 | 0 | .29 |
| 15 | 0 | 800 | 0 | 0 | .8 |
| | TOTALS | 100,000 | 90,000 | 90% | 100% |

*FIG. 10*

1000

1001 1002 1003 1004 1005 1006

1009

| RESULT LEVEL ID | RESULT VALUE | # OF RESULTS | TOTAL VALUE | PAYOUT % | PROB. % |
|---|---|---|---|---|---|
| 0 | 3000 | 1 | 3000 | 3 | .001 |
| 1 | 0 | 3 | 0 | 0 | .003 |
| 2 | 0 | 5 | 0 | 0 | .005 |
| 3 | 0 | 30 | 0 | 0 | .030 |
| 4 | 50 | 50 | 2500 | 2.5 | .050 |
| 5 | 20 | 100 | 2000 | 2 | .1 |
| 6 | 10 | 200 | 2000 | 2 | .2 |
| 7 | 5 | 936 | 4680 | 4.68 | .936 |
| 8 | 2 | 18660 | 37320 | 37.32 | 18.66 |
| 9 | 1 | 30000 | 30000 | 30 | 30 |
| 10 | 0 | 48922 | 0 | 0 | 48.922 |
| 11 | 1000 | 1 | 1000 | 1 | .001 |
| 12 | 500 | 1 | 500 | 0.5 | .001 |
| 13 | 100 | 1 | 100 | 0.1 | .001 |
| 14 | 10 | 290 | 2900 | 2.9 | .29 |
| 15 | 5 | 800 | 4000 | 4 | .8 |
| | TOTALS | 100,000 | 90,000 | 90% | 100% |

*FIG. 11*

USER ALTERABLE PRIZE DISTRIBUTION AND SYSTEM FOR IDENTIFYING RESULTS IN GAMES

TECHNICAL FIELD OF THE INVENTION

The present invention relates to systems for assigning results in wagering games and games such as sweepstakes games which do not involve wagering. More particularly, the invention relates to a data structure which allows a game operator to add or omit predefined prize levels to thereby alter the prize distribution for a given game. The invention encompasses a user alterable result level structure itself as well as a method and system for assigning prizes in a game.

BACKGROUND OF THE INVENTION

Most wagering games are each ultimately associated with some prize distribution which defines the probability of winning a given prize in the game on a given play. For example, mechanical and video reel-type games, commonly referred to as "slot machines" are generally each associated with a number of different prize levels which are each associated with some result in the game. Some of the results are associated with a prize at one of the available prize levels, while other results represent losing results which are not associated with any prize to the player. Each of the prize levels is associated with a probability of achieving the result at that particular prize level. This probability may be expressed in terms of some number of times a result at that prize level is expected to be achieved over the course of some number of plays in the game. For example, a given reel-type game may be configured to award a top prize once every million plays at the gaming machine, and lesser prizes more frequently.

There are a large number of ways in which the result may be identified for a given play in a game. Many modern reel-type games, for example, employ some result identifying algorithm that is designed to identify results at the frequencies defined by a desired result distribution for the game. Continuing with the example in the previous paragraph, the result identifying algorithm for the reel-type gaming machine may be designed to identify the top prize an average once every one million plays at the gaming machine. The result identifying algorithm may be implemented using an unalterable processing device that is certified to identify results according to the desired result distribution. This unalterable and certified processing device, which is typically located in a secure location in the gaming machine, helps ensure the game operates as intended and that the probabilities of obtaining the various prizes available in the game are not surreptitiously altered.

Electronically implemented instant lottery systems provide another way to assign results in various types of game presentations. A "game presentation" as used in this disclosure refers to the symbols and graphic representations used to communicate a result to a player. These electronic lottery systems are sometimes referred to as "video lottery" systems because they commonly show the result of a play in the lottery game on a video display device at the player terminal. In an electronic lottery gaming system, such as the system described in U.S. Pat. No. 6,733,385, the results are identified by a set of electronic lottery records (also referred to as "lottery game play records"). The set of electronic lottery game play records is analogous to a set of printed paper lottery game tickets. As with individual tickets from a set of printed lottery tickets, individual lottery game play records may be assigned from the set of electronic lottery game play records in some random order in response to requests for plays in the lottery game. However, the result defined by an assigned electronic lottery game play record is displayed at an electronic lottery player station rather than on a printed lottery ticket. As in traditional paper lotteries, the rules by which the set of lottery records is created for an electronic lottery game determines the overall prize distribution for the game. For example, an electronic lottery game set may include one million records, with one record associated with the top prize, ten records associated with a next highest prize, and so forth throughout all of the potential results available in the lottery game set. Thus, the overall probability of obtaining the highest prize in the lottery game set is one in one million, and the overall probability of obtaining one of the next highest prizes is ten in one million (one in one hundred thousand).

Some sweepstakes games are similar to lottery games in that the results in the sweepstakes game may be identified by sweepstakes records that are produced in sets similar to lottery ticket sets or electronic lottery game play record sets. A difference between lottery games and sweepstakes games is that sweepstakes games are not wagering games and do not require a player to place a wager in return for a play in the game. Rather, plays in sweepstakes games are given to a player typically in association with the player's purchase of some good or service. For example, a purchaser may be given one play in an instant sweepstakes game for the purchase of a soft drink. As another example, a purchaser may be given some number of plays in a sweepstakes game for the purchase of each minute of Internet or computer access time at an Internet café. U.S. patent application Ser. No. 11/365,058 provides an example of a sweepstakes gaming system in which results are identified through sweepstakes game sets made up of sweepstakes game records similar to electronic lottery game play records.

Yet another way to identify results for display at an electronic player station is to conduct a bingo game between two or more players. U.S. patent application publication No. 2004-0152499-A1 discloses a bingo gaming system in which each play entered at a player station enters the player in a bingo game. The various bingo game entries (that is, game play requests) are quickly grouped in the system shown in this published patent application, a bingo game is conducted, and the results in the game for each player are returned to the respective player terminal. The result may be displayed at the player terminal by a suitable game presentation, which may imitate play in a card game, a traditional reel-type game, or some other game.

In the case of a bingo game, a desired prize distribution may be produced by mapping one or more bingo patterns to each prize level so that the overall probability of achieving any bingo pattern mapped to a given prize level is approximately equal to the desired probability of awarding the prize at that prize level. This mapping of bingo patterns to produce a desired prize distribution is shown for example in U.S. patent application publication No. 2004-0048647-A1.

Prize distributions implemented through result identifying algorithms, lottery game sets, sweepstakes game sets, and bingo games have previously been unalterable. The only way to implement a different prize distribution for a particular game was to replace the result identifying arrangement for the game. In the case of a game in which results were identified by a result identifying algorithm, this required changing or reprogramming the processing device used to implement the result identifying algorithm. In the case of games in which results are identified from a set of game play records, such as some lottery games and sweepstakes games, the only way to replace the result identifying arrangement was to replace the set of game play records built according to the desired prize distribution. In the case of games in which results are identified from conducting bingo games, the only way to replace the result identifying arrangement was to change the mapping between bingo patterns and the various prize levels or otherwise change the rules by which prizes were identified from the underlying bingo games. All of these processes for replacing the result identifying arrangement were cumbersome and costly. Also, these prior processes did not allow for temporary changes in a result identifying arrangement to accommodate various promotional prizes that could be desirable to a game provider or operator.

SUMMARY OF THE INVENTION

The present invention includes a data structure for use in a gaming system. This data structure, which will be referred to herein as a "result level structure," provides one or more, and preferably many, user definable prize levels that may be enabled to effect a change in the prize distribution for a game. The user alterable prize distribution structure according to the invention allows a game operator to easily offer special promotional prizes to game players, and also provides a convenient arrangement for modifying the prize distribution for games at any time, either in connection with changing a game presentation offered at a gaming machine or otherwise. The invention also encompasses methods for awarding results in a game, and apparatus and program products for enabling a user to modify the prize distribution in a game.

One preferred result level structure according to the present invention includes a number of first result levels and a second result level. Each first result level correlates a respective result level identifier and a respective result value. Each first result level is also associated with a respective expected number of results per given number of plays in a game. At least one of the first result levels includes a nonzero result value and at least one of the first result levels includes a zero result value. As with each first result level, the second result level is associated with a respective expected number of results per given number of plays in the game. In contrast to the first result levels, however, the second result level correlates a respective result level identifier and a respective user definable result value field which may hold any suitable result value designated by a game operator. Thus, the second result level represents a user alterable result level. The user definable result value field for the second result level is initially set to zero to define a base prize distribution for a game applying the result level structure. However, the base prize distribution provided by this result level structure may be modified easily by merely assigning a nonzero result value in the user definable result value field. Replacing the preset zero value in the user definable result value field with a nonzero result value has the effect of changing the respective expected number of results associated with the second result level from zero value results to results having the user defined nonzero value.

The second result level may be associated with a relatively small number of expected results for a given number of plays in the game. For example, the second result level may be expected only once in a large number of plays in the game. This sort of second result level is suitable for assigning a relatively high-value result as a special promotion in the game. However, the second result level may be associated with any expected number of results per given number of plays in the game. For example, the expected number of results for the second result level may be 50, 100, 1000, or more per given number of plays in the game. Second result levels associated with relatively larger values for expected number of results per given number of plays are suitable for assigning relatively low-value prizes.

It should be noted that the respective expected number of results associated with each result level, both each first result level and the second result level, remains the same whether the operator definable result value field for the second result level remains set at the zero value or has been set to some nonzero value. Thus, the probability of achieving a result at any of the result levels remains constant regardless of any modification of the value at a operator definable result value field. Because the probability for each result level remains constant regardless of whether the value in the operator definable result value field has been modified, the particular arrangement used in the game for identifying the result for a given play may remain unchanged whether the operator definable result value field is set to zero or some nonzero value. This means that the result level structure according to the present invention allows the operator to modify the prize distribution for the game without changing the underlying procedure for identifying results in the game.

The term "user" is used in the above description of the present invention and hereafter to refer to the entity that causes the value in the user definable result value field to be modified. Generally, the user will be an operator or provider for the game. However, the invention is not limited to any particular user. For example, a gaming system embodying the principles of the invention may allow a player at a player station to modify a value in a user definable result value field, and thus may qualify as a user. Furthermore, modifications to one or more user definable result value fields according to the present invention may be performed in an automated fashion in which case the user is represented by the arrangement for making the modification in an automated fashion.

The reference to the "game" in the preceding description of the present invention is a reference to the game by which results are awarded. A game with which the invention may be employed may be an electronic lottery-type game in which results are awarded from a set of electronic lottery game records. A game with which the invention may be employed may alternatively comprise an electronic sweepstakes game in which results are awarded from a set of sweepstakes game records. Alternatively, the game may be a bingo game in which players compete to obtain one or more prize-winning bingo patterns. The game may also be a stand-alone, slot machine-type game in which the result for a given play is selected according to some algorithm. It should be appreciated that a game with which the invention may be employed is not limited to any particular graphic or other technique for showing the result of a play to a player. That is, the invention is not limited to any particular game presentation as defined above. For example, any of the four examples listed above, an electronic lottery-type game, sweepstakes game, bingo game, or slot machine-type game, may show the result for a given play in the game through a set of mechanical or video spinning reels which carry various indicia at their periphery. These spinning reels may be controlled to stop showing a certain indicia combination which is correlated to the result for the play in the game. Alternatively, the present invention may be employed in gaming systems in which results are shown through a representation of a card game, a simulated race or other competition, simulated dice, or any other manner in which a result may be revealed to a player.

In some preferred forms, the result level structure includes one or more additional second result levels. As with each other result level in the result level structure, each additional second result level is associated with a respective expected number of results per given number of plays in the game.

Each respective additional second result level also correlates a respective result level identifier and a respective operator definable result value field, and thus represents a operator alterable result level. These respective operator definable result value fields are set to zero as described above for the single second result level. However, the operator may modify the prize distribution provided by the result level structure by simply replacing one or more of the zero values in the operator definable result value fields with a respective nonzero value. Also, where there are multiple additional second result levels, the invention encompasses the case in which one or more of the additional second result levels are not initially associated with a zero value in the respective operator definable result value field. In these forms of the invention, the operator may modify the prize distribution provided by the result level structure by setting one or more zero-valued operator definable result value fields to respective nonzero values and by setting one or more nonzero-valued operator definable result value fields to zero. In this fashion, it is possible for the operator to modify the prize distribution provided by the result level structure without necessarily changing the overall payout for the game.

One preferred method according to the present invention includes storing a result level structure as described above with a number of first result levels and a second result level having a user definable result value field set to a preset value. This result level structure is stored at an appropriate data storage device in the particular gaming system or gaming device. This preferred method also includes replacing the preset value for the user definable result value field with a user defined value. The method further includes awarding results in the game according to the result level structure after replacing the preset value with the user defined value.

A method according to the present invention may also include displaying a respective prize distribution characteristic such as a payout percentage for the result level structure. This display may be performed in response to selecting a new value for one or more of the respective user definable result value fields. Thus, the invention allows a user to add some prospective result value to the user definable result value field for one of the user alterable result levels (second result levels) and then see the result of the change prior to actually making the change in the result level structure. Displaying one or more of the prize distribution characteristics when the user selects a result level value change helps the user ensure that the resulting prize distribution meets the user's desired criteria. Some forms of the invention may include an additional data structure, which may be referred to as a prize distribution characteristic table, that includes information on a number of different assumed combinations of values for the various result level value fields included in the particular result level structure. This additional data structure may contain a number of prize distribution characteristics for each assumed combination of result level values.

A program product according to the invention includes assignment program code and management program code stored in one or more computer-readable devices. The assignment program code is executable for assigning results in a game according to a result level structure such as that described above that includes one or more user alterable result levels. The management program code is executable for receiving a replacement selection specifying a user defined value for a respective user definable result value fields and then replacing the preset value for a respective user definable result value field with the specified user defined value in response to a replacement input. The management program code may also be executable to cause at least one prize distribution characteristic to be displayed at a display device after the replacement selection and preferably before the replacement input.

An apparatus embodying the principles of the invention includes an assignment arrangement and a management component. The assignment arrangement assigns results in a game according to a result level structure as described above. The management component responds to a replacement input to replace the respective result value for at least one result level with a user defined result value. In one preferred form, the prize assignment arrangement includes a result level assignment component, a result level structure storage device, and a result control component. The result level assignment component identifies a respective one of the result level identifiers for each respective play in the game, while the result level structure storage device stores the result level structure for the game. The result control component awards a result for each respective play in the game such that each awarded result has a result value defined by the stored result value structure.

These and other advantages and features of the invention will be apparent from the following description of the preferred embodiments, considered along with the accompanying drawings.

BRIEF DESCRIPTION OF THE DRAWINGS

FIG. 1 is a representation of a result level structure and associated values embodying the principles of the invention and suitable for use in lottery or sweepstakes games, or in games in which a result identifying algorithm is used to identify results in the game.

FIG. 2 is a representation of a result level structure as in FIG. 1, but further including an association to a bingo pattern set for each result level that may include a prize.

FIG. 10 is a representation of an alternate result level structure according to the present invention, together with values associated with the result level structure.

FIG. 11 is a representation of the result level structure shown in FIG. 10, but with the user alterable result levels modified according to the invention to produce a different prize distribution from the result level structure.

DESCRIPTION OF PREFERRED EMBODIMENTS

Figure 3:
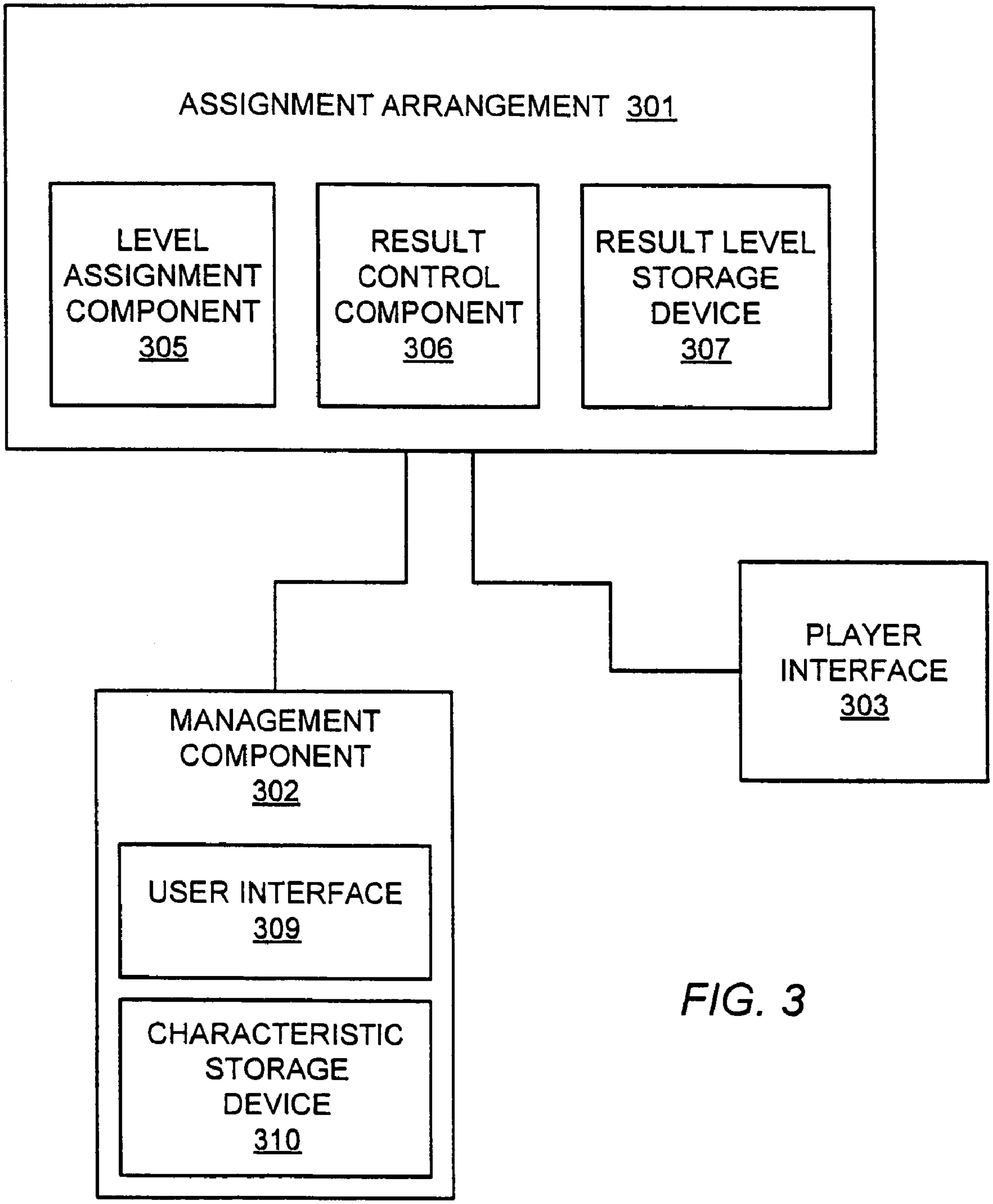
FIG. 3 is a diagrammatic representation of an apparatus according to one preferred form of the invention.

In the following disclosure, FIGS. 1 through 5 will be used to describe basic aspects of the present intention. FIGS. 6 through 9 will be used to describe specific implementations of the invention in connection with various gaming systems. FIGS. 10 and 11 will be used to describe an implementation of the invention in which result level values may be modified without changing the overall payout of the game.

As shown in FIG. 1, a result level structure 100 embodying the principles of the invention may be represented as a data table including two columns, column 101 and column 102. The data included in the remaining columns shown in FIG. 1, namely, columns 103, 104, 105, and 106 contain information associated with result level structure 100. Result level structure 100 includes a number of result levels each represented by a row 109 in the table shown in FIG. 1. For each result level 109, result level structure 100 includes a result level identifier under column 101 and a result value under column 102. At each result level 109, column 103 shows a value for the number of results per given number of plays in the game under the label "# of results." As indicated at the bottom of column 103, this particular example table assumes a total of 100,000 plays in the game. Thus, each value in column 103 represents that number of results for each 100,000 plays in the game. The value in column 104 at each result level 109 represents the total value of the results at that particular result level. This value is the product of the result value and the number of results at that particular result level. The value in column 105 at each result level 109 represents the payout percentage for the given result level, that is, the percentage of the total value at that result level as compared to the total payout in the game for the given number of plays. Finally, the value in column 106 for each result level 109 represents the probability of achieving that particular result level in the given number of plays represented as a percentage. It is assumed in FIG. 1 that each play in the game is made with a wager of one credit. Thus for 100,000 plays in the game, the game would produce a total of 100,000 credits. The total value paid out is 90,000 as shown at the bottom of column 104 which represents an overall payout percentage of 90 percent as indicated at the bottom of column 105.

According to the invention, two different types of result levels are included with the result levels 109 of result level structure 100. The result levels 109 associated with result identifiers 0 through 10 (in column 101) may be referred to as first result levels. These first result levels each include an unalterable result value in column 102 of result level structure 100. In this example, the result values correlated to result identifiers 0 through 9 are nonzero values while the result value correlated to result level identifier 10 is the value zero. In addition to the first result levels, the result level structure 100 includes a second result level identified by result identifier 11 in column 101, and a number of additional second result levels, identified by result level identifiers 12 through 15. Each second result level includes a user definable result value field under column 102 rather than a unalterable result value. In the example of FIG. 1, all of the user definable result value fields are preset to the value of zero. However, all of the user definable result value fields may be changed from the preset value to a user defined value. Setting the preset value for a given second result level to a user defined value effectively adds a number of winning results in the game. In particular, setting a preset zero value for one of the user definable result value fields to a nonzero value adds the number of results associated with that second result level to the total number of winning results in the game. For example, a user may wish to offer a relatively high-value promotional prize to encourage playing in the game. In this case, the user may replace the preset zero value for the result level 109 identified by result level identifier 11 with a result value of 5000 credits. This change for the result value at the result level identified by result identifier 11 from zero to 5000 adds a single 5000 credit prize to the game. This would change the total value for the result level 109 identified by result identifier 11 to 5000 (under column 104) and change the payout percentage for that result level to 5 percent (under column 105). Adding the additional result value to the game would also change the overall payout percentage from 90 to 95 percent and the total payout value to 95,000, for the full 100,000 results listed under column 103. However, the probability of achieving the second result level identified by result identifier 11 remains at 0.001 percent.

As will become apparent from the discussion below with regard to FIGS. 3 through 5, and the specific examples discussed in connection with FIGS. 6 through 9, the result level structure 100 according to the invention including user alterable result level values provides a number of advantages. One important advantage is that the change of a result value according to the invention does not affect the manner in which results may be selected to achieve the probabilities shown in column 106 for each result level 109. This is the case because the probability of achieving the result at a given result level remains the same whether a user definable result value field associated with a second result level is preset to zero or changed to some nonzero value. The user definable result value fields may be changed from the preset value to a desired result value at any time either before or after results are awarded according to result level structure 100. It is also possible for a user to use one of the second result levels to provide a promotional prize for some period of time and then change the result value for the respective second result level back to zero after some period of playing the game.

FIG. 2 shows the same result level structure 100 shown in FIG. 1 adapted for use in connection with a bingo gaming system. In particular, FIG. 2 shows that each result level 109 other than that associated with result level ID 10 is also associated with a pattern set identified by a pattern set identifier. These pattern set identifiers are shown in column 201 in FIG. 2 under the label "PAT. SET ID." Each pattern set includes one or more bingo patterns as necessary to produce the probability of winning the bingo game at that result level, given the particular rules of the bingo game. For example, the result level 109 shown at result identifier 0 is associated with a bingo pattern set shown by pattern set identifier 0. This bingo pattern set includes one or more bingo patterns such that the probability of achieving any of the bingo patterns in the set in a given bingo game is approximately equal to 0.001 percent, the probability for that result level. Each of the other pattern sets for the other result levels 109 are similarly populated with one or more bingo patterns as necessary to achieve the probability of obtaining that result level for a given bingo game. The result level associated with result level ID 10 represents a default level which is assigned for a game play request when the player achieves a bingo pattern not included in any of the pattern sets. The application of the present invention in a bingo gaming system will be described further below in connection with FIG. 8.

FIG. 3 shows an apparatus for applying a result level structure such as structure 100 shown in FIGS. 1 and 2 to award results for plays in a game. The apparatus shown in FIG. 3 includes three basic components, an assignment arrangement 301, a management component 302, and a player interface 303. Plays in the game are made from player interface 303. Player interface 303 also preferably includes a display or other notification arrangement to communicate the result of a play to the player. Assignment arrangement 301 is illustrated in FIG. 3 as including a level assignment component 305, a result control component 306, and a result level storage device 307. These components of assignment arrangement 301 cooperate to award results in a game according to the desired result level structure according to the invention. The process by which results are awarded according to the invention will be described below in connection with FIG. 4.

Management component 302 is included in the apparatus shown in FIG. 3 to allow a user such as a game operator to assign result values to certain second result levels in the result level structure to offer promotional prizes or simply to change the prize distribution for the game. The illustrated management component includes a user interface 309 and a characteristic storage device 310. The operation of management component 302 will be described below in connection with the flow chart of FIG. 5.

The apparatus shown in FIG. 3 is presented generically in that figure so as to facilitate a generalized description of the processes described further below in connection with FIGS. 4 and 5. The specific structure employed for assignment arrangement 301, management component 302, and player interface 303 will depend in large part on the nature of the game with which the invention is employed. However, it will be appreciated that assignment arrangement 301 may include a suitable general purpose or special purpose processing device, or collection of processing devices programed or otherwise configured to perform the various functions described below in connection with FIG. 4. Result level storage device 307 may comprise any suitable data storage device for storing a result level structure according to the invention. Management component 302 may comprise a suitable computer workstation having a display, keyboard, and pointer combination or any other suitable arrangement for the user interface 309. Characteristic storage device 310 may comprise any suitable data storage device for storing prize distribution characteristics as will be described below in connection with FIG. 5. Player interface 303 may include a player station for an electronic lottery, sweepstakes, or bingo game, or may include a gaming machine user interface for some sweepstakes games and for stand-alone games such as stand-alone slot machine games.

Figure 4:
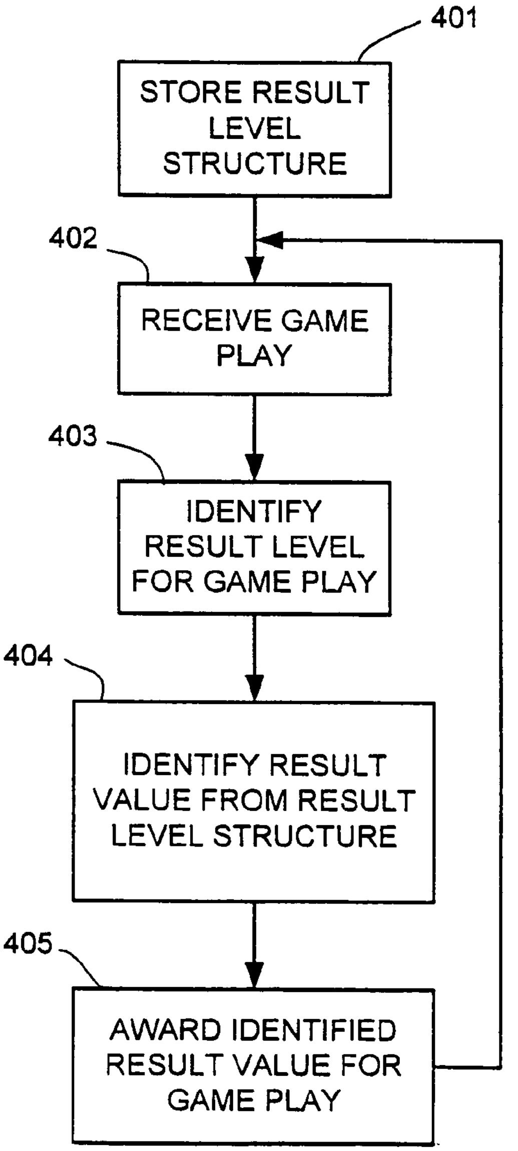
FIG. 4 is a flow chart showing a method of awarding result values using a result level structure according to one preferred form of the invention.

FIG. 4 comprises a flow chart showing method steps employed according to the invention to award results in a game. As indicated at process block 401, the method includes storing a result level structure according to the invention at a suitable storage device. The method shown in FIG. 4 also includes receiving a game play as shown at process block 402, and then identifying a result level for the game play as indicated at process block 403. Once the result level for the game play has been identified, the illustrated method includes using the stored result level structure to identify the result value which corresponds to the identified result level as indicated a process block 404. This identified result value is awarded for the game play as indicated at process block 405.

The step of storing the result level structure as indicated at process block 401 stores the desired result level structure in a data storage device. The result level structure, such as structure 100 shown in FIG. 1, may be stored in any suitable storage device and in any fashion that makes the relationship between each result level and its corresponding result value available to the system component responsible for identifying the result value as shown at process block 404. In the example arrangement shown in FIG. 3, result level storage device 307 is used to store the applicable result level structure for the game. Storage device 307 for storing the result level structure need not be part of the processing device or devices that implement level assignment component 305 and/or result control component 306. Furthermore, the storage device for storing the result level structure is not limited to any particular type of storage device and may comprise a hard drive, flash memory device, random access memory for a processing device, or any other type of data storage device. Also, the invention is not limited to any particular form in which the result level structure is stored, although some preferred forms of the invention simply store the result level structure in the form of a single data table correlating each result level to a respective result value or user definable result value field.

The invention encompasses any suitable procedure for receiving a game play as shown at process block 402. Generally, the game play will be received from a suitable player interface such as player interface 303 in FIG. 3. In some implementations of the invention, the player interface 303 will be included at a player station separate from the device or devices which implement assignment arrangement 301. In this case, the game play may be communicated over a suitable network communication path from the player station and may be received either directly at level assignment component 305 or an intermediary to that component. In these network communication cases, the game play may be communicated in the form of a packet of data that identifies itself as a game play and includes other information to identify the source of the game play and perhaps other information such as the game being played. Where player interface 303 in FIG. 3 comprises an interface associated with a stand-alone gaming machine, for example, the actual signal communicated from the player interface to prize level assignment component 305 or an intermediary, may comprise a signal such as may be generated by depressing a mechanical or virtual "play" button, or pulling a lever such as the lever of a slot-machine.

The procedure employed at process block 403 may be performed by level assignment component 305 in the system shown in FIG. 3. This process to identify a result level for a game play may also vary widely within the scope of the present invention and thus the specific functions performed by component 305 may vary widely within the scope of the present invention. Where the game is an electronic lottery-type game, level assignment component 305 in FIG. 3 may perform the step shown at process block 403 by selecting an electronic lottery ticket record from a set of such records that have been created according to the result level structure and the associated number of results at each result level. The result level or some information defining a result level may be read from the selected electronic lottery ticket record. A similar process of selecting a sweepstakes record may be employed for an electronic sweepstakes game. Alternatively, where the game is an electronic bingo game, identifying the result level at process block 403 may include conducting a bingo game for the received game play and one or more other game plays and identifying the result level correlating to the achieved bingo pattern. In particular, the result level assignment component such as component 305 in FIG. 3 may conduct a bingo game, identify a bingo pattern for the received game play, and then identify the particular result level which is associated with the bingo pattern set that includes that particular pattern. As yet another alternative, where the game comprises a stand-alone slot machine type game, the step at block 403 may involve applying a result identifying algorithm at level assignment component 305 to generate a result level identifier consistent with the result level probabilities associated with the stored result level structure.

The step of identifying a result value from the result level structure as shown at block 404 in FIG. 4 is not necessarily dependent upon the type of game being played, and thus may be consistent across the different types of games that may be implemented according to the invention. Regardless of the particular game, the step shown at process block 404 in FIG. 4 preferably includes querying the stored result level structure to locate the result level identified at process block 403, and then reading the result value included for that result level. In one preferred arrangement, the step at process block 403 generates the respective result level identifier for one of the result levels and this result level identifier is used to obtain the corresponding result value from the stored result level structure. In the system shown in FIG. 3, this step is preferably performed by result control component 306 performing a look up in the result level structure stored by result level storage device 307.

The result awarding step shown at process block 405 in FIG. 4 is also preferably independent of the particular game implemented according to the invention. In this awarding step, the responsible component, such as result control component 306 shown in FIG. 3, communicates information on the result value identified at process block 404 to the appropriate system components for awarding the result value to the player that initiated the game play which was received at process block 402. This may include communicating the result value itself to an accounting system (not shown) for the game, or communicating to the accounting system information from which the result value may be determined. The result value or information from which it may be identified may also or alternatively be communicated to the player interface 303. It should be noted that this awarding step shown at process block 405 in FIG. 4 may be independent of the steps required to cause the player interface 303 to reveal the result to the player. For example, an index value may be communicated to a system including the player interface 303 in order to communicate the result of play for display through the player interface, and a separate communication may be made to an accounting system (not shown) to actually award the result value to the player. Alternatively, the communication to award the result value and to cause the player interface 303 to display a graphic representation of the result may be combined into a single communication from, for example, result control component 306 to a gaming machine including player interface 303.

Figure 5:
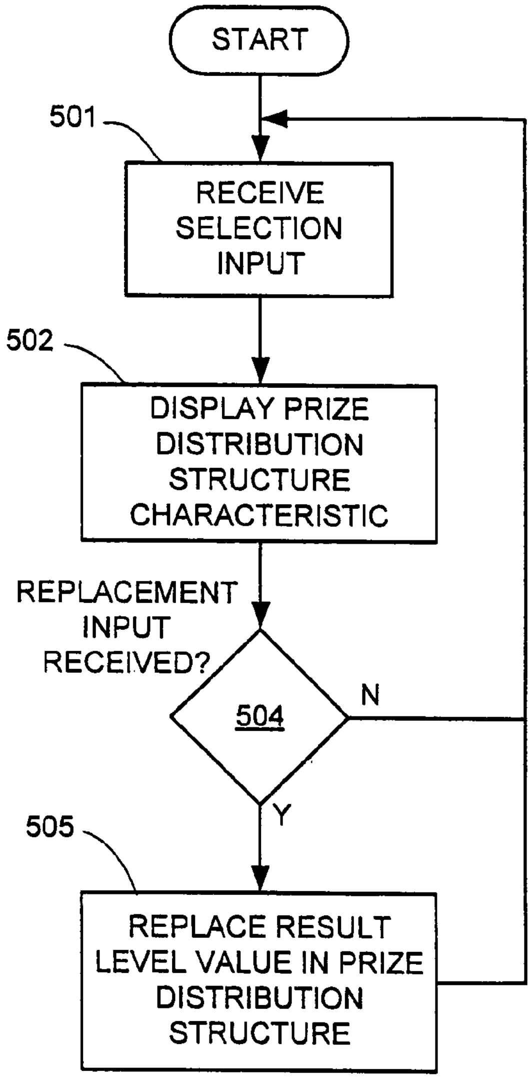
FIG. 5 is a flow chart showing a method of modifying a result level structure according to one preferred form of the present invention.

FIG. 5 illustrates one preferred method of modifying the prize distribution in a game according to the present invention. As indicated at process block 501 in FIG. 5, the method of modifying the prize distribution in a game may be initiated with the receipt of a selection input. This selection input may be entered through, and received at, a component such as management component 302 in FIG. 3, and identifies a potential user defined result value for replacing a result value for a second result level in a result level structure according to the invention (such as structure 100 shown in FIG. 1). In the preferred method shown in FIG. 5, the receipt of the selection input prompts the management component 302 to display one or more prize distribution characteristics at a display device associated with the management component user interface 309. This display step is shown at process block 502 in FIG. 5 and will be described further below. If a replacement input is received as indicated by a positive outcome at decision block 504, the process includes replacing a designated result level value for a second result level in the result level structure (such as result level structure 100 shown in FIG. 1). This replacement step is indicated at process block 505 and is preferably initiated through the management component 302 in response to the replacement input entered at the management component. However, the replaced value along with the remainder of the result level structure is stored at least at storage device 307 shown in FIG. 3, so that the modified result level structure is available to result control component 306 as described above in connection with process block 404 in FIG. 4.

It should be noted that the steps indicated at process blocks 501 and 502 are optional steps that may be performed to help the game operator ensure the prize distribution is modified in the desired way. In particular, identifying a proposed user defined value for a given user alterable, second result level, and then displaying resultant prize distribution characteristics as indicated at process block 502 allows the user to see the effect of the modification prior to actually implementing the modification. The types of characteristics that may be displayed as indicated at process block 502 include any characteristics that indicate the feel of the game to the players or indicate the financial aspects of the game. For example, a characteristic that may be displayed at process block 502 includes the payout percentage or hold percentage for the game as it would be modified by the selected change in the result level structure. Other characteristics include the overall probability of achieving a winning result for a play, and the overall probability of achieving a winning result at least at a given prize value.

It will be appreciated that the process steps described above in connection with FIGS. 4 and 5 may be performed by processing devices under the control of operational program code. For example, a general purpose computer executing appropriate program code may serve as Assignment arrangement 301 to perform the steps shown in FIG. 4. Also, a general purpose computer executing appropriate program code may serve as management component 302 to perform the steps shown at process blocks 501, 502, and 504 in FIG. 5, together with the step of initiating the replacement of the result level value as indicated at process block 505. Thus, the invention encompasses computer program code stored on one or more data storage devices and effective for directing one or more computers to perform the various steps and functions described above. One program product according to the invention includes assignment program code which is executable for assigning results in a game according to a result level structure as described above in connection with FIG. 4. This program product may also include management program code which is executable for performing the functions and process steps described above in connection with FIG. 5.

Figure 6:
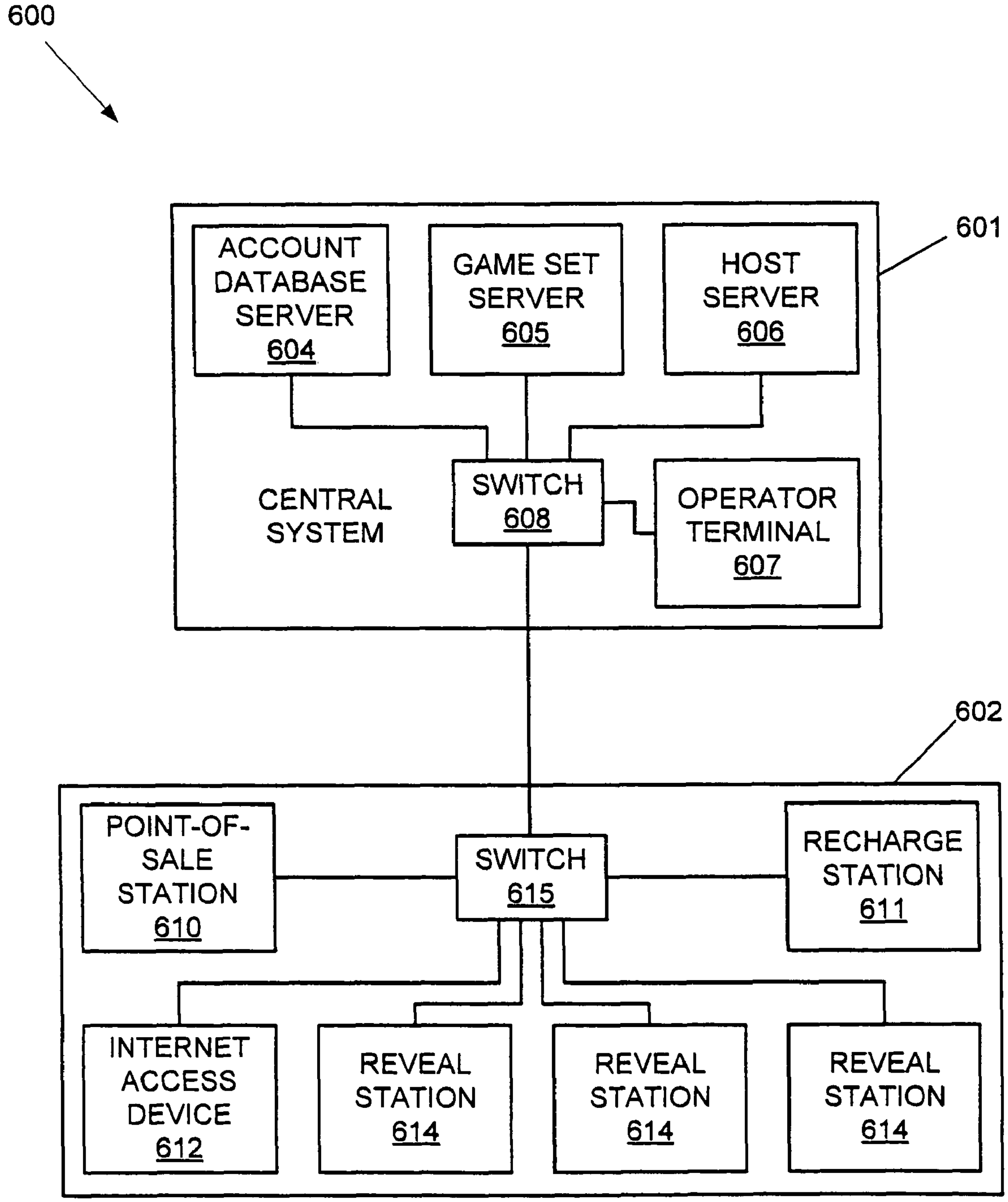
FIG. 6 is a diagrammatic representation of a sweepstakes system in which the present invention may be employed.

It will be beneficial to now describe the present invention in the context of several specific types of games and gaming systems. FIG. 6 shows a sweepstakes system 600 in which the present invention may be implemented. This particular system awards sweepstakes entries primarily in response to the purchase of Internet access time at an Internet cafe, however, it will be appreciated that a similar sweepstakes system may be associated with numerous other types of products.

Sweepstakes system 600 includes a central system 601 for managing user accounts relating to the sale of Internet access time and relating to the play of a sweepstakes game offered in connection with the sale of Internet access time. Sweepstakes system 600 also includes a player system 602 which includes a number of devices that together allow a player to purchase Internet access time, use the purchased Internet access time, reveal sweepstakes entries assigned to a player based on the player's purchase of Internet access time, and redeem winnings associated with the revealed sweepstakes entries.

The illustrated central system 601 includes three separate processing devices, an account database server 604, a game set server 605, and a host server 606. Each of these separate processing devices may comprise a suitable computer system that operates under the control of respective operational program code. The player system 602 shown in FIG. 6 includes four different types of devices, a point-of-sale station (POS) 610, a recharge station 611, an Internet access device 612, and several reveal stations 614. Sweepstakes system 600 also includes a communications arrangement indicated by networking devices 608 and 615 and the connections between those devices and the other system components.

Sweepstakes system 600 enables a player to purchase Internet access time at a POS 610 or recharge station 611, and assigns one or more sweepstakes entries to a player account that is correlated in some fashion to the player who purchased the Internet access time. The sweepstakes entries may be assigned from a predetermined set of sweepstakes entry records stored at central system 601. After being assigned a number of sweepstakes entries, a player may go to a reveal station 614 and reveal the results for their assigned sweepstakes entries. The player may redeem the sweepstakes winnings at a suitable device included in player system 602, such as a POS 610.

When implemented according to the present invention, the sweepstakes entry records included in a sweepstakes game set are each associated with a result level taken from a sweepstakes result level structure such as that shown in FIG. 1. At least some of the result levels will comprise user alterable result levels such as the second result levels described above in connection with FIG. 1. In one preferred sweepstakes system, the various components of central system 601 performs all of the functions of the assignment arrangement 301 described above in connection with FIG. 3 and FIG. 4. In particular, in response to a reveal request from a reveal station 614, the central system 601 selects a particular sweepstakes entry record that has been assigned to the player and is available to have the corresponding result revealed. This sweepstakes entry selection corresponds to the process described above for level assignment component 305 shown in FIG. 3 and described at process block 403 in FIG. 4 to define a result level in the sweepstakes game. Central system 601 then identifies a result value for the result level by querying a suitable storage device included in the central system which stores a result value structure according to the present invention. This step corresponds to the step performed by result control component 306 in FIG. 3 and described in connection with process block 404 in FIG. 4. The storage device in central system 601 from which the result value is identified corresponds to storage device 307 shown in FIG. 3. With the result value now identified for the selected sweepstakes entry record, central system 601 places the identified result value in the player's account balance to be redeemed. This step corresponds to the awarding step shown at process block 405 in FIG. 4. Alternatively to simply placing the identified result value in the player's account balance to be redeemed, especially promotional result values that have been defined by the system operator according to the invention may be designated as hand-pays, and paid to the player at the reveal station according to a suitable hand-pay procedure.

Operator terminal 607 included in central system 601 may serve as a management component according to the present invention. Thus, operator terminal 607 corresponds to management component 302 shown in FIG. 3 and described further in connection with FIG. 5. In particular, operator terminal 607 may be used to make a replacement input to replace a user alterable result level value in the result level structure stored at central system 601. This replacement of the result level value corresponds to the step shown at process block 505 in FIG. 5. By providing the ability to replace one or more result level values in the result level structure, central system 601 allows the sweepstakes operator to assign a promotional result value for one of the user definable result value fields. This promotion may be offered without having to change the underlying sweepstakes game set from which sweepstakes entries are selected. Also, the promotion may be started after sweepstakes entries have already been assigned from a sweepstakes game set and may be ended at any time simply by replacing the promotional value with zero.

Operator terminal 607 may also be used to implement the method steps shown at process blocks 501 and 502 in FIG. 5. A selection input identifying a prospective replacement result value for a given second result level may be entered with a suitable user input associated with operator terminal 607. This step corresponds to the step shown at process block 501 in FIG. 5. Operator terminal 607 may respond to the selection input by displaying one or more prize distribution characteristics which are preferably retrieved from a suitable storage device associated with the terminal and storing various characteristics for various assumed replacement values.

It should be noted that in the electronic sweepstakes system 600 there is inevitably a delay between the time that a sweepstakes entry record is assigned to the player based on their purchase of the Internet access time, and the time that the result associated with the assigned sweepstakes entry record is revealed to the player. Because the present invention allows the system operator to essentially modify the result value associated with a given sweepstakes entry record, the sweepstakes system should apply some rule as to when the result value for a given sweepstakes entry record is set. In a preferred implementation, the result value for a given sweepstakes entry record is set at the time it is assigned to the player, regardless of any subsequent modifications to the result level structure according to the present invention.

Figure 7:
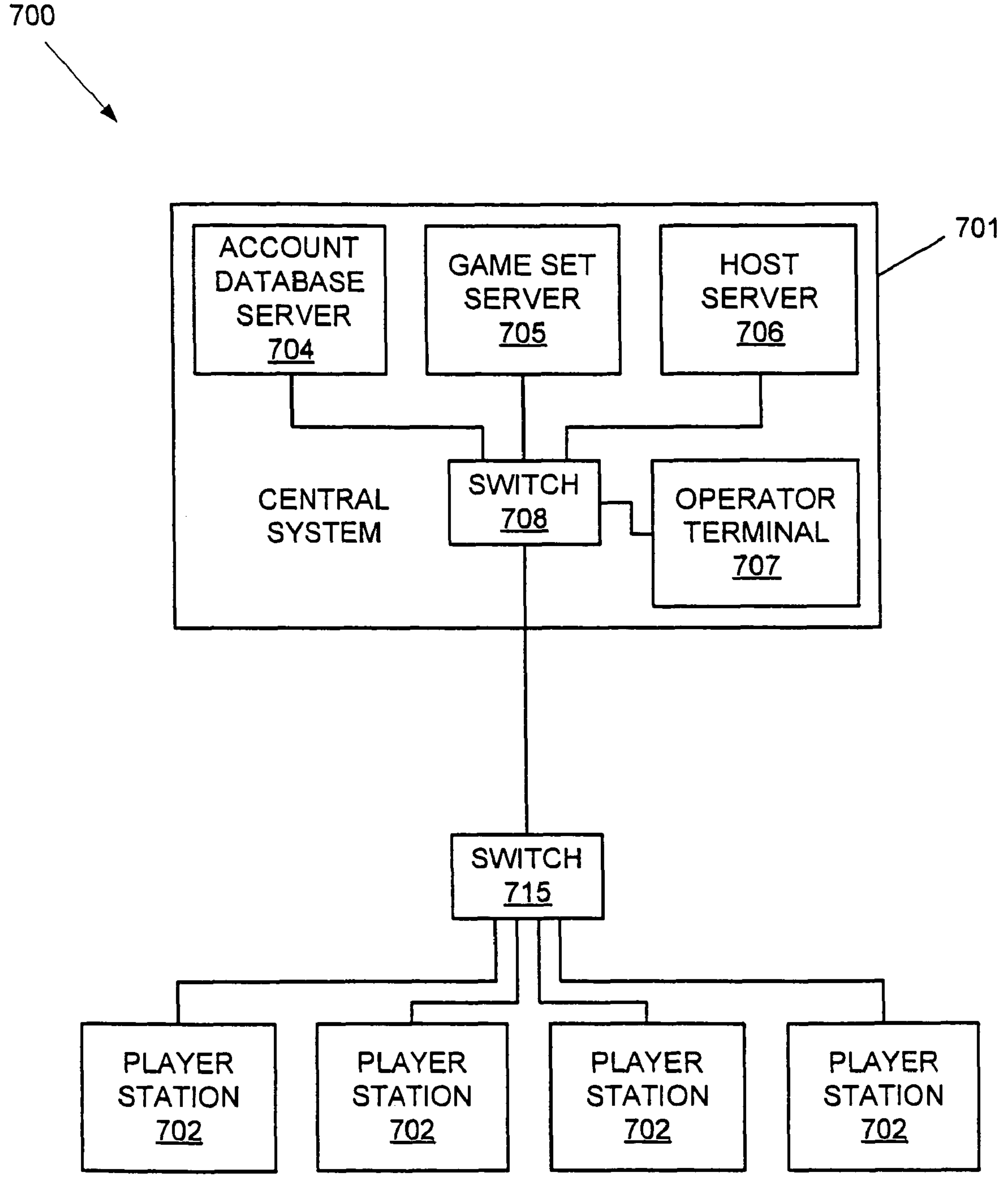
FIG. 7 is a diagrammatic representation of an electronic lottery system in which a result level structure according to the present invention may be employed.

FIG. 7 shows an electronic lottery system 700 that may be implemented using user definable result level values within the scope of the present invention. Lottery system 700 includes a central system 701 for managing player accounts and data structures relating to the play of a lottery game. Lottery system 700 also includes a number of player stations 702 through which a lottery player may purchase electronic lottery records and see the results associated with those records.

The illustrated central system 701 includes three separate processing devices, an account database server 704, a game set server 705, and a host server 706, together with an operator terminal 707. Each of these separate elements may comprise a suitable computer system that operates under the control of respective operational program code. System 700 also includes a communications arrangement indicated by networking devices 708 and 715 and the connections between those devices and the other system components.

Results in the lottery game are identified from electronic lottery records included in a lottery game set. This lottery game set may be stored at a suitable component at central system 701, and is created according to a result level structure according to the invention and associated information that define the probabilities associated with each result level in the result level structure. More specifically, the lottery game set is created to have the desired number of results at each result level to produce the desired probability for achieving each respective result level.

The various components of central system 701 may perform all of the functions of the assignment arrangement 301 described above in connection with FIGS. 3 and 4. In particular, in response to a lottery game play request from a player station 702, central system 701 selects a particular lottery record from the lottery game set of a subset thereof. This result selection corresponds to the process described above for level assignment component 305 shown in FIG. 3 and described at process block 403 in FIG. 4 to identify a result level in the lottery game. Central system 701 then queries a suitable storage device included in the central system which stores the result value structure for which the game set was created. This step of identifying a result value associated with the selected result level corresponds to the step performed by result control component 306 in FIG. 3 and described in connection with process block 404 in FIG. 4. The storage device in central system 701 from which the result value is identified corresponds to storage device 307 shown in FIG. 3. With the result value now identified for the selected lottery record, central system 701 awards the identified result value to the player or player's account in accordance with the result awarding procedures employed by the lottery system. This step corresponds to the awarding step shown at process block 405 in FIG. 4.

Operator terminal 707 for lottery system 700 corresponds to management component 302 shown in FIG. 3 and described further in connection with FIG. 5. In particular, operator terminal 707 may be used to make a replacement input to replace a result level value in the user alterable result level structure stored in the suitable storage device included in central system 701. This replacement of the result level value corresponds to the step shown at process block 505 in FIG. 5. As in the sweepstakes system described above, the ability to replace one or more result level values in the result level structure allows the lottery operator to assign a promotional result value for one or more of the user definable result value fields. This promotion may be offered without having to change the underlying lottery game set from which lottery records are selected.

Figure 8:
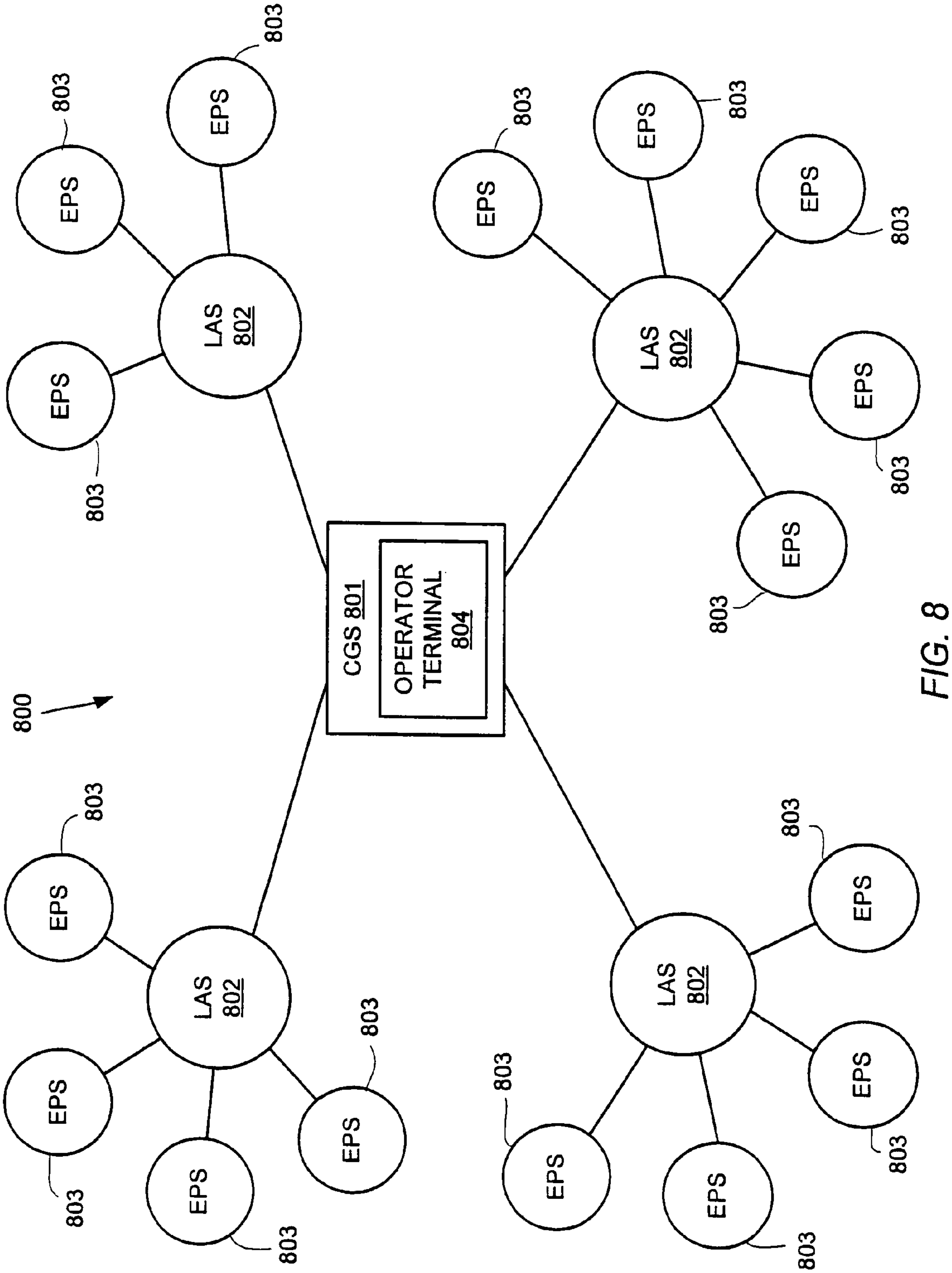
FIG. 8 is a diagrammatic representation of a bingo gaming system in which a result level structure according to the present invention may be employed.

FIG. 8 shows a bingo gaming system 800 which may use a result level structure in accordance with the present invention. Bingo gaming system 800 includes a central game server (CGS) 801 that cooperates with a number of other components to enable bingo players at a number of different gaming sites to participate in bingo games. Each gaming site includes a local area server (LAS) 802 and a number of player stations (EPSs) 803. Players at the various EPSs 803 enter game play requests which each represent a request to enter a bingo card in a bingo game for the respective player. LASs 802 forward these game play requests to CGS 801 which is responsible for grouping the game play requests into groups and conducting a bingo game for each group. CGS 801 also identifies the bingo patterns produced for each player in the course of the bingo game and causes the result for each play to be communicated back to the appropriate EPS 803.

In accordance with the present invention, each pattern produced in the game is mapped to a pattern set, and each pattern set is associated with a respective one of the result levels for the result level structure. This arrangement is shown in the example result level structure shown in FIG. 2. One or more processing devices included in CGS 801 performs the functions of the assignment arrangement 301 shown in FIG. 3. Each of the EPSs 803 represent a player interface as shown at 303 in FIG. 3.

In operation, a player may enter a game play request at an EPS 803 and this game play request is communicated to CGS 801. CGS 801 conducts a bingo game including the bingo card representation defined for the game play request, and identifies a pattern of spots achieved on the bingo card in the course of the bingo game. This achieved pattern may be used together with the pattern set definitions and result level mapping shown for example in FIG. 2 to identify the result level for the game play as indicated at process block 403 in FIG. 4. That is, once the player's pattern is identified for the bingo game, that pattern may be used to locate a pattern set in a suitable data structure storing the relationship, and, if a pattern set is located, that pattern set or default level may be used to locate a result level through the relationships exemplified in the table shown in FIG. 2. With the result level identified, CGS 801 may identify the result value associated with the result level from the stored result level structure according to the invention. This step of identifying the result value corresponds to the step at process block 404 in FIG. 4. CGS 801 may then communicate the identified result value to the appropriate components of the system to award the result to the respective player in a step which corresponds to the step shown at process block 405 in FIG. 4.

The operator terminal 804 included in bingo gaming system 800 serves as the management component illustrated at 302 in FIG. 3. This operator terminal 804 cooperates with the storage device which stores the result level structure at CGS 801 to perform the process described in connection with blocks 504 and 505 of FIG. 5. Operator terminal 804 may also be configured to perform the steps described above in connect with process blocks 501 and 502 in FIG. 5.

Figure 9:
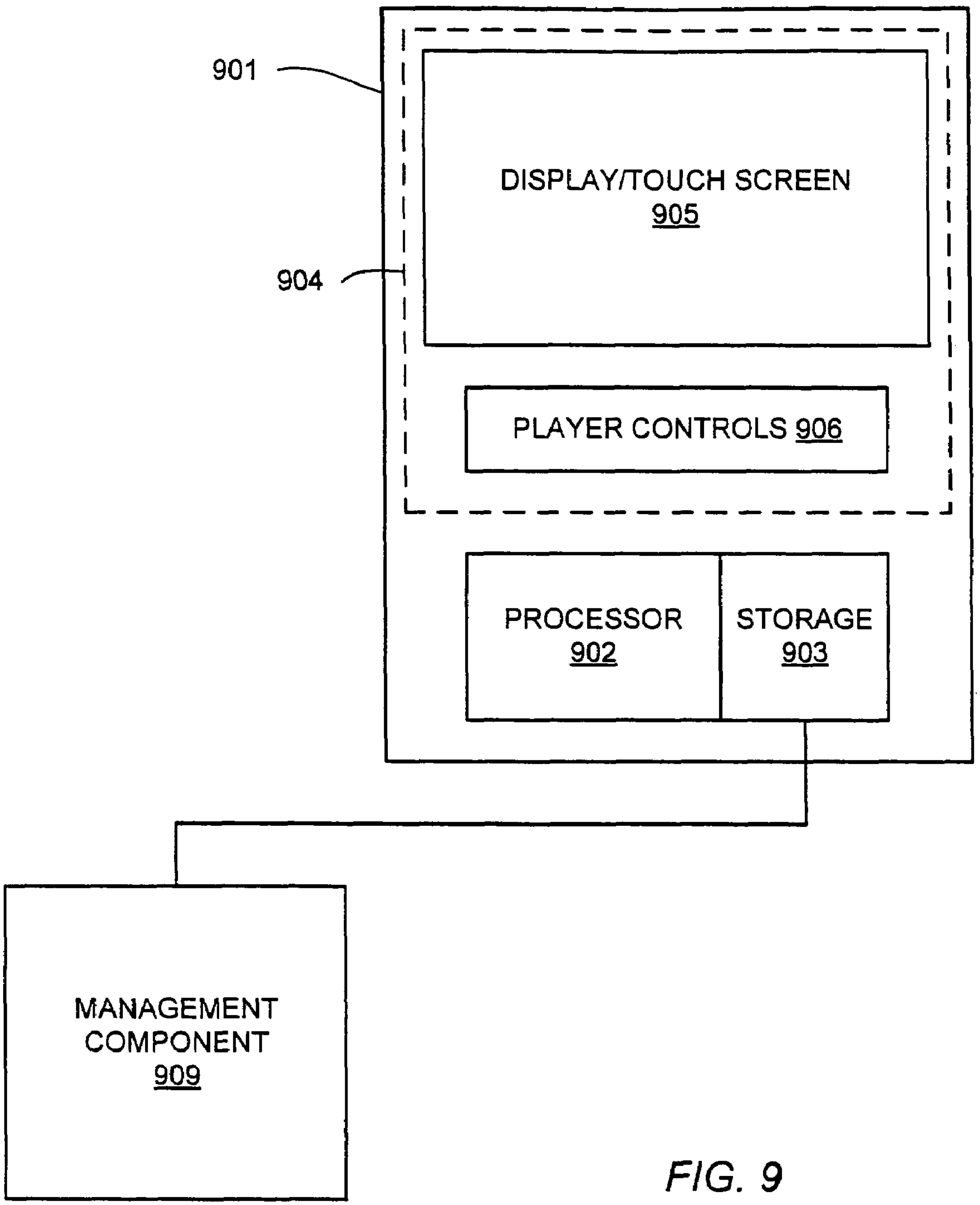
FIG. 9 is a diagrammatic representation of a stand-alone gaming machine in which a result level structure according to the present invention may be employed.

FIG. 9 shows a stand alone gaming machine 901 that may use a result level structure in accordance with the present invention. Gaming machine 901 includes a processing device 902 for controlling the operation of the gaming machine, and a data storage device 903 associated with the processing device. Gaming machine 901 also includes a player interface shown in dashed box 904, which includes a display device/touchscreen 905 and player controls 906.

Among its other functions to control gaming machine 901, processing device 902 may perform all of the functions of components 305 and 306 in the device shown in FIG. 3. In particular, processing device 902 may execute a suitable result level generating algorithm to identify a result level for each game play entered through player interface 904. This function of identifying a result level for a play corresponds to the step shown at process claim 403 in FIG. 4. Processing device 902 may also identify the result value for the result level in accordance with the step shown at process block 404 in FIG. 4, and then award the identified result value to the player in accordance with process block 405 in FIG. 4.

FIG. 9 also shows a management component 909 in communication with gaming machine 901. Management component 909 corresponds to the device 302 described above in connection with FIG. 3 and the flow chart of FIG. 5, and allows an operator with appropriate access to enter a replacement input to replace a result level value in the result level structure in accordance with the step shown at process block 505 in FIG. 5. Management component 909 may also receive a selection input for a prospective result level modification in accordance with process block 501 in FIG. 5, and cause certain prize distribution characteristics to be displayed at a display device associated with the management component.

FIGS. 10 and 11 show an alternative result level structure 1000 according to the invention along with its associated values. The alternative result level structure 1000 is similar to structure 100 shown in FIG. 1 in that it includes a total of sixteen result levels, each represented by a different row 1009 of the table. Each result level 1009 includes a result level identifier under column 1001 and a result value under column 1002. Each result level 1009 is also associated with a number of results under the column 1003. The additional column 1004 shows the total value for the respective result level 1009. Column 1005 shows the payout percentage for each respective result level 1009, and column 1006 show probability of achieving the respective result level in the game in the given number of plays expressed as a percentage. As for result level structure 100 shown in FIG. 1, the total number of results is 100,000 with each result obtained at the cost of one credit, and the total value paid out is 90,000 credits providing a payout percentage of 90%.

Unlike result level structure 100 shown in FIG. 1, result level structure 1000 shown in FIGS. 10 and 11 includes more second result levels, that is, result levels having a user definable result value field for which the user may modify the value. In result level structure 1000, at least the result levels 1009 identified be result level identifiers 1 through 3 and 11 through 15 are result levels having a user definable result value field under column 1002. Result level structure 1000 is designed to provide two different prize distributions for the given number of results (100,000) and without changing the total payout and payout percentage. Referring to FIG. 11, the user definable result value field for each of the result levels 1009 identified by result level identifiers 1 through 3 may be set to zero making those result levels losing result levels. However, the user definable result value field for each of the result levels 1009 identified by result level identifiers 11 through 15 may be changed to specific nonzero values to provide the same win values for the game, but different win probabilities for the different win values. That is, result level structure 1000 as modified in FIG. 11 still provides results valued at 3000, 1000, 500, 100, 50, 20, 10, 5, 2, 1, and 0 credits, but the probabilities of achieving a result level 1009 at the 1000, 500, and 100 credit values have been reduced slightly, while the probabilities of achieving a result level 1009 at the 10 and 5 credit values have been increased significantly. The total probability of achieving a result value of 5 credits goes from 0.936% (the result level 1009 identified by result level identifier 7) for result structure 1000 as defined in FIG. 10 to 1.736% for result level structure 1000 as defined in FIG. 11 (the result levels 1009 identified by result level identifiers 7 and 15). This is accomplished by setting the user definable result value field correlated to result level identifier 15 to 5 credits for FIG. 11. Also, the total probability of achieving a result value of 10 credits goes from 0.2% (the result level 1009 identified by result level identifier 6) for result structure 1000 as defined in FIG. 10 to 0.49% for result level structure 1000 as defined in FIG. 11 (the result levels 1009 identified by result level identifiers 6 and 14). This is accomplished by setting the user definable result value field correlated to result level identifier 14 to 10 credits for FIG. 11.

It will be noted by comparing result level structure 100 in FIG. 1 to result level structure 1000 in FIGS. 10 and 11 that zero valued results have essentially been borrowed from the result level associated with result level identifier 10 in order to provide the same total number of results for the two result level structures. This may be convenient for producing result level structures according to the invention for use with electronic lottery games and electronic sweepstakes games; however, it is not necessary for the present invention.

It should also be noted that the invention is by no means limited to any particular number of result levels and any particular number of result levels having a user definable result level field. The particular example result level structure 100 shown in FIGS. 1 and 2 and result level structure 1000 shown in FIGS. 10 and 11 include a total of sixteen result levels as a simple and convenient example for describing the invention. A result level structure according to the present invention may include a large number of result levels having a user definable result level field in order to produce many different potential result or prize distributions from the single result level structure. It is also possible within the scope of the invention for each result level in the result level structure to have a user definable result level value field. However, a result level structure according to the invention will typically include an unalterable result level in which the result level value is set to zero. In any case, each result level is associated with a unique and unalterable expected number of results at the respective result level per given number of plays in the underlying game, since it is this characteristic of the invention that allows the underlying result level identifying method (lottery record set, sweepstakes entry set, algorithm, or bingo pattern mapping) to remain the same while changing the prize distribution for the game.

As used herein, whether in the above description or the following claims, the terms "comprising," "including," "carrying," "having," "containing,""involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims. In particular, the various processing steps described above may be performed by any suitable processing device or devices included in the system.

The invention claimed is:

1. A method for operating a gaming system, the method comprising:

(a) storing a data structure on a computer-readable medium, the data structure for use in a gaming system, the data structure including:

(i) a number of first result levels, each first result level correlating a respective result level identifier, a respective result value, an expected number of results per given number of plays in a game, a payout percentage, and a non-zero probability percentage, wherein at least one of the first result levels is associated with a nonzero result value and at least one of the first result levels is associated with a zero result value; and (ii) a plurality of second level results, each second result level correlating a respective result level identifier, a non-zero expected number of results per given number of results in the game, a payout percentage, a non-zero probability percentage, and a respective operator definable result value field, the operator definable result value field being set to zero, the second result level, unlike the first result levels, being included to provide the ability for changing its corresponding operator definable result value field to a nonzero value after the gaming system has been deployed and operated using the operator definable result value field with the zero value;

(b) in response to a first game outcome including a result level ID value, reading the data structure with game software executed on a gaming machine by looking up a result level identifier in the data structure with the result level ID value, and selecting an associated one of the result values or one of the operator definable result value fields for use in a first game result, and causing the first game result to be displayed on an electronic display on the gaming machine and an electronic indicator of a player's credit value to be updated with the associated one of the result values;

(c) sometime after causing the first game result to be displayed, receiving a first value from an operator at a system operator terminal in response setting the operator definable result value field to the first value received from the operator at a system operator terminal; and (d) sometime after setting the operator definable result value field to the first value, in response to a second game outcome including a result level ID value, reading the data structure with game software executed on a gaming machine by looking up the second result level in the data structure and selecting the operator definable result value field for use in a second game result, providing the second game result having a result value equal to the first value received from the operator, and causing the second game result to be displayed on the electronic display on the gaming machine and an electronic indicator of the player's credit value to be updated with the first value.

2. The method of claim 1, wherein the first result levels and the second result levels contained in the media are each associated with a respective set of one or more sweepstakes prizes and the game comprises a sweepstakes game.

3. The method of claim 1, wherein the first result levels and the second result levels are each associated with a respective set of one or more bingo patterns and the game comprises a bingo game, and further comprising:

(a) before receiving the first value from the operator, providing a bingo game result in which the second result level is accessed and a corresponding zero credit award is provided; and (b) after setting the operator definable value field, providing a bingo game result in which the second result level is accessed and a corresponding nonzero credit award is provided.

4. The method of claim 1, wherein the second result levels are associated with an identical value for the respective expected number of results per given number of plays in the bingo game.

5. The method of claim 1, wherein at least one of the operator definable result value fields is associated with a probability of occurrence that is lower than the probability of occurrence of a lowest nonzero result value associated with the number of first result levels.

6. A method for operating a gaming system, the method comprising:

(a) storing a result level structure on a computer-readable medium, the result level structure including a number of first and a plurality of second result levels, each first result level correlating a respective result level identifier, a respective predetermined result value, a respective expected number of results per expected number of results in a game, a payout percentage, and a non-zero probability percentage, wherein at least one of the first result levels is associated with a nonzero result value and at least one of the first result levels is associated with a zero result value; each second result level correlating a respective result level identifier, a non-zero expected number of results per given number of results in the game, a payout percentage, a non-zero probability percentage, and a preset value in an operator definable result value field, the operator definable result value field being set to zero, the second result levels, unlike the first result levels, being included to provide the ability for changing its corresponding operator definable result value fields to values different from the preset values after the gaming system has been deployed and operated using the operator definable result value fields with the preset values;

(b) in response to a first game outcome including a result level ID value, reading the data structure with game software executed on a gaming machine by looking up a result level identifier in the data structure with the result level ID value, and selecting an associated one of the result values or one of the operator definable result value fields for use in a first game result, and causing the first game result to be displayed on an electronic display on the gaming machine and an electronic indicator of a player's credit value to be updated with the associated one of the result values;

(c) sometime after causing the first game result to be displayed, receiving a first value from an operator at a system operator terminal in response setting the operator definable result value field to the first value received from the operator at a system operator terminal; and (d) sometime after setting the operator definable result value field to the first value, in response to a second game outcome including a result level ID value, reading the data structure with game software executed on a gaming machine by looking up the second result level in the data structure and selecting the operator definable result value field for use in a second game result, providing the second game result having a result value equal to the first value received from the operator, and causing the second game result to be displayed on the electronic display on the gaming machine and an electronic indicator of the player's credit value to be updated with the first value.

7. The method of claim 6, wherein the preset value for two or more of the operator definable result value fields is equal to zero.

8. The method of claim 6 further including:

(a) identifying the operator defined value with a selection input prior to replacing the preset value in the media with the operator defined value; and (b) displaying a prospective payout percentage for the result level structure in response to identifying the operator defined value, the prospective payout percentage comprising the payout percentage associated with the result level structure as modified by the operator defined value.

9. The method of claim 6, wherein each of the first result levels and the second level results are each associated with a respective set of one or more bingo patterns and the game comprises a bingo game.

10. The method of claim 6, wherein the preset values are replaced after results have been displayed in the game according to the result level structure including the preset values for the second result levels.

11. The method of claim 6, wherein the first result levels and the second result levels contained in the media are each associated with a respective set of one or more sweepstakes prizes and the game comprises a sweepstakes game.

12. The method of claim 6, wherein at least one of the first result levels is associated with a nonzero predetermined result value, and wherein at least one of the operator definable result value fields is associated with a probability of occurrence that is lower than the probability of occurrence of a lowest nonzero predetermined result values associated with the number of first result values.

13. A program product stored in one or more non-transient computer-readable devices, and executable for operating a game on a gaming system, the program product comprising:

(a) assignment program code executable for assigning results in a game according to a result level structure, the result level structure including a number of first result levels and a plurality of second result levels, each first result level correlating a respective result level identifier, a respective predetermined result value, an expected number of results per given number of plays in the game, a payout percentage, and a non-zero probability percentage, wherein at least one of the first result levels is associated with a nonzero result value and at least one of the first result levels is associated with a zero result value; and the second result level correlating a respective result level identifier, a non-zero expected number of results per given number of results in the game, a payout percentage, a non-zero probability percentage, and a respective preset operator definable result value field, the operator definable result value field being set to zero, the second result level, unlike the first result levels, being included to provide the ability for changing its corresponding operator definable result value field to a non-zero value after the gaming system has been deployed and operated using the operator definable result value field with the preset value;

(b) management program code executable for, in response to a first game outcome including a result level ID value, reading the result level structure with game software executed on a gaming machine by looking up a result level identifier in the result level structure with the result level ID value, and selecting an associated one of the result values or one of the operator definable result value fields for use in a first game result, and causing the first game result to be displayed on an electronic display on the gaming machine and an electronic indicator of a player's credit value to be updated with the associated one of the result values;

(c) the management program code further executable for, sometime after causing the first game result to be displayed, replacing preset values in the operator definable result value fields with operator defined values received from an operator at a system operator terminal; and (d) the management program code further executable for, sometime after setting operator definable result value fields to the operator defined values, in response to a second game outcome including a result level ID value, reading the result level structure with game software executed on a gaming machine by looking up the second result level in the data structure and selecting the operator definable result value field for use in a second game result, providing the second game result having a result value equal to the operator defined value, and causing the second game result to be displayed on the electronic display on the gaming machine and an electronic indicator of the player's credit value to be updated with the operator defined value.

14. The program product of claim 13, wherein the assignment of results in the game includes selecting a respective result level identifier and then finding the respective result value, the preset value, or the operator defined result value correlated to the selected result level identifier.

15. The program product of claim 13 wherein the management program code is also executable to cause at least one prize distribution characteristic to be displayed at a display device after a selection input which identifies the operator defined value prior to replacing the preset value.

16. The program product of claim 13 wherein the assignment program code is executable to assign results in the game by assigning game play records from a set of game play records.

17. The program product of claim 13 wherein the assigned results are identified from one or more bingo games.

18. The apparatus claim 13, wherein at least one of the first result levels is associated with a nonzero result value, and wherein at least one of the operator definable result value fields is associated with a probability of occurrence that is lower than the probability of occurrence of a lowest nonzero result values associated with the number of first result values.

19. The program product of claim 15, wherein the at least one prize distribution characteristic includes the payout percentage associated with the result level structure as modified by the operator defined value.

20. A gaming system, comprising:

(a) a prize assignment arrangement for assigning results in a game according to a result level structure, the result level structure including a number of first and a plurality of second result levels, each first result level correlating a respective result level identifier, a respective predetermined result value, a respective expected number of results per expected number of results in a game, a payout percentage, and a non-zero probability percentage, wherein at least one of the first result levels is associated with a nonzero result value; each second result level correlating a respective result level identifier, a non-zero expected number of results per given number of results in the game, a payout percentage, a non-zero probability percentage, and a preset value in an operator definable result value field, the operator definable result value field being set to zero, the second result levels, unlike the first result levels, being included to provide the ability for changing its corresponding operator definable result value fields to values different from the preset values after the gaming system has been deployed and operated using the operator definable result value fields with the preset values; and (b) a management component for, in response to a first game outcome including a result level ID value, reading the data structure with game software executed on a gaming machine by looking up a result level identifier in the data structure with the result level ID value, and selecting an associated one of the result values or one of the operator definable result value fields for use in a first game result, and causing the first game result to be displayed on an electronic display on the gaming machine and an electronic indicator of a player's credit value to be updated with the associated one of the result values;

(c) the management component further adapted to, sometime after causing the first game result to be displayed, receiving a first value from an operator at a system operator terminal in response setting the operator definable result value field to the first value received from the operator at a system operator terminal; and (d) the management component further adapted to, sometime after setting the operator definable result value field to the first value, in response to a second game outcome including a result level ID value, reading the data structure with game software executed on a gaming machine by looking up the second result level in the data structure and selecting the operator definable result value field for use in a second game result, providing the second game result having a result value equal to the first value received from the operator, and causing the second game result to be displayed on the electronic display on the gaming machine and an electronic indicator of the player's credit value to be updated with the first value.

21. The apparatus of claim 20, wherein the prize assignment arrangement includes:

(a) a result level assignment component for selecting a respective one of the result level identifiers for a respective play in the game;

(b) a result level storage device for storing the result level structure; and (c) a result control component for displaying a result for each respective play in the game, each displayed result having the respective result value correlated with a corresponding result level identifier selected by the result level assignment component for the respective play in the game.

22. The apparatus of claim 20 wherein the management component includes a display device, and wherein the management component is also for displaying one or more prize distribution characteristics in response to a selection input which identifies the operator defined value prior to replacing the respective result value for the at least one operator definable result level.

23. The apparatus of claim 21 wherein the result level assignment component and result control component are implemented in a common processing device.

24. The apparatus of claim 21 wherein the result level assignment component selects a game play record from a predetermined set of game play records to select the respective result level for a respective play in the game.

25. The apparatus of claim 21 wherein the result level assignment component applies a result identifying algorithm to select the respective result level for a respective play in the game.

26. The apparatus of claim 21 wherein the result level assignment component conducts a bingo game to select the respective result level for a respective play in the game.

27. The apparatus of claim 22 wherein the management component obtains the one or more prize distribution characteristics from a characteristic storage device in response to the selection input.

28. The apparatus of claim 27 wherein the characteristic storage device stores a number of different distribution characteristic sets, each associated with a respective result level structure with a result value for each operator definable result level.

* * * * *